INVENTOR.
WENDELL G. EKDAHL

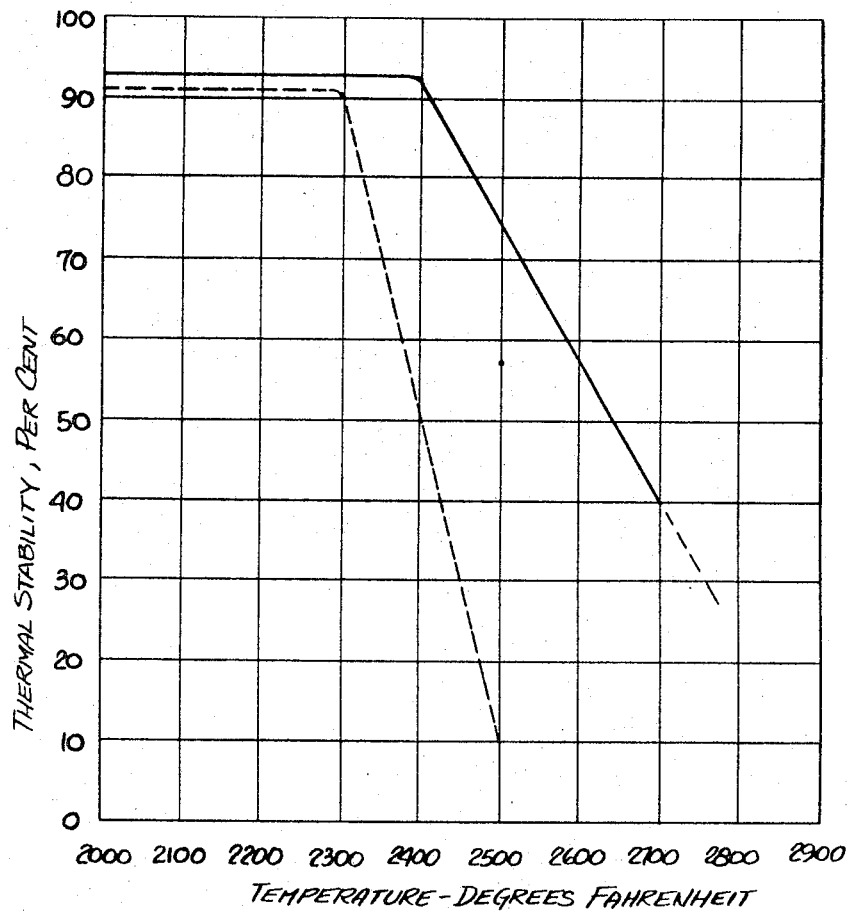

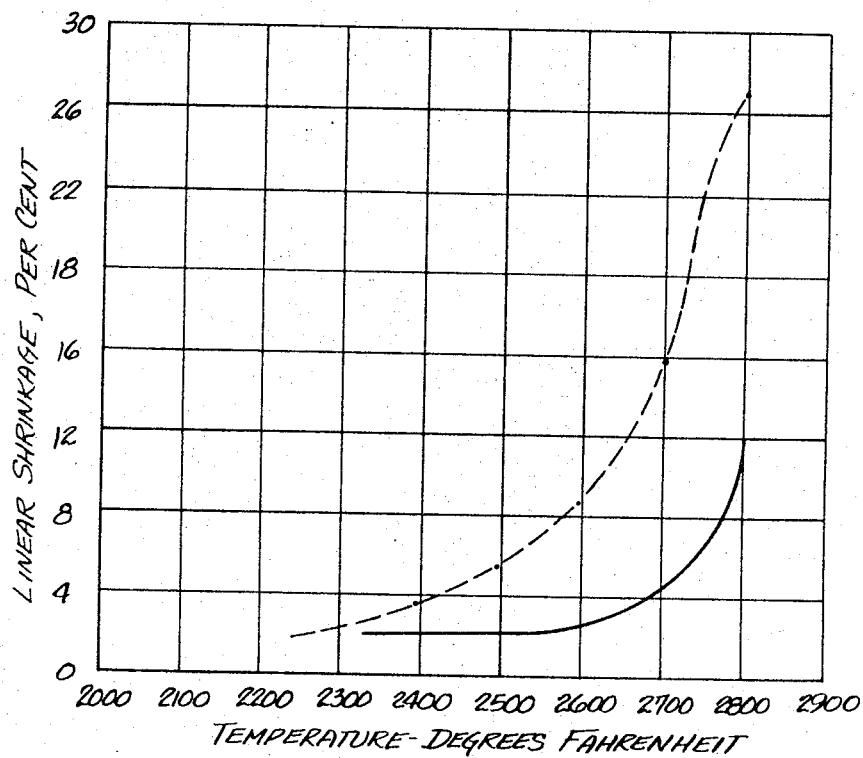

United States Patent Office

3,449,137
Patented June 10, 1969

3,449,137
REFRACTORY FIBERS FOR SERVICE TO 2700° F.
Wendell Graydon Ekdahl, Martinsville, N.J., assignor to Johns-Manville Corporation, New York, N.Y., a corporation of New York
Filed Oct. 13, 1965, Ser. No. 495,469
Int. Cl. C03c 13/00
U.S. Cl. 106—50                                                                                                                 12 Claims

ABSTRACT OF THE DISCLOSURE

Refractory inorganic fibrous products of markedly increased thermal stability and resistance composed of specific and critical combinations of alumina-silica-chromia.

---

Figure 1:
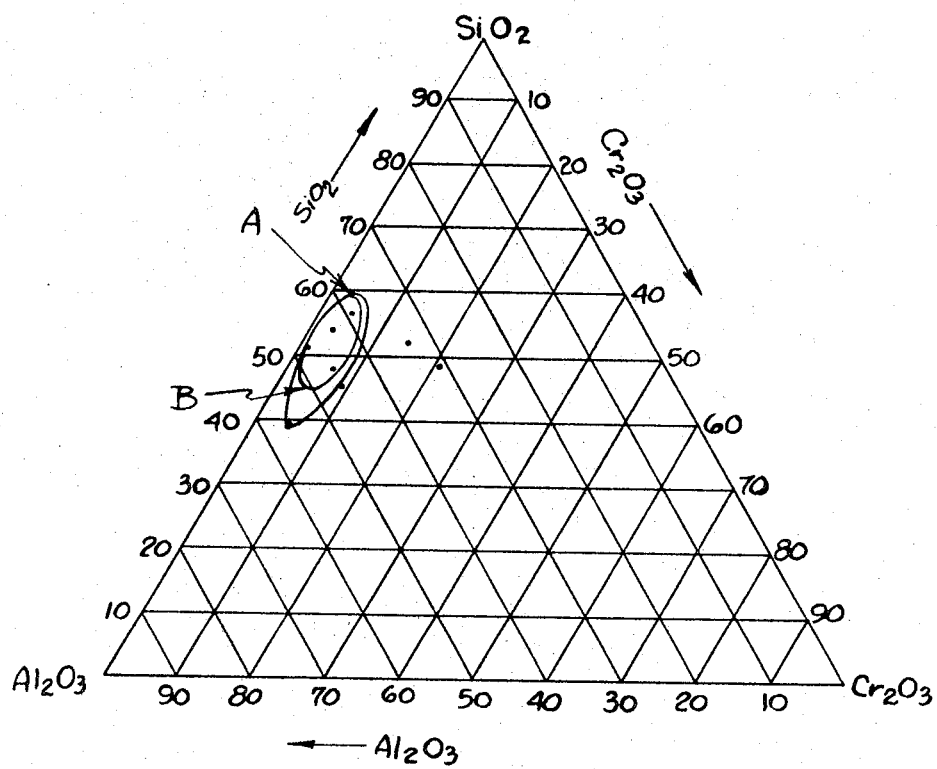

This invention relates to refractory inorganic fibers and means of increasing the thermal stability of such fibers. More specifically the invention is directed to fibers of a specific area of novel glass compositions providing, among other significant advantages, extensively improved stability at very high temperature levels.

Notwithstanding frequent generalized claims as to outstanding resistance to high temperatures and acknowledged appreciably higher actual melting points of many glasslike materials, there are but a very limited number of refractory inorganic or glass compositions available, or even known, which in the form of fine fibers provide effective and satisfactory insulating service at temperature conditions exceeding about 2000° F. over any appreciably extended period of time. Typically, at temperatures above about 1500° F., and almost without exception at temperatures less than about 2000° F., the known refractory glasses in fine fibrous form suitable for thermal insulating purposes, tend to devitrify or crystallize, with the rate thereof rapidly accelerating with increased temperatures, and this devitrification results in the embrittlement of the fibers and degradation of their integrity. For instance, any currently available glass composition in fine fiber form will become completely embrittled and, as a result, its strength and resiliency drastically and irreparably impaired upon long term exposure to temperatures in the order of 2000° F. Normally insulating fibers are embodied in conventional felted or the like constraining insulation constructions whereby they retain substantially their original fiber form, and in turn their initial thermal insulating properties while maintained immobile, notwithstanding their thermal embrittlement. Nevertheless, few, if any, actual applications or services requiring very high temperatures fibrous insulations are completely free from motion or forces, and in their normal applications such as supersonic aircraft, rocket or missile, etc., installations, or even simply furnace combustion chamber liners, they are subjected to very severe vibrations and stresses or impingement and abrasive action, whereby upon any appreciable embrittlement the fiber form fails and their bodies disintegrate into fine particles and the insulating value thereof is totally lost.

Moreover, aside from structural integrity of the fibers or preservation of their fibrous form, typical high temperature resistant glasses undergo severe shrinkage at temperatures in the order of 2000° F. which is evidenced by a linear reduction in the fiber dimension and a corresponding reduction in the thermal insulating efficiency and in the integrity of the fibrous body.

Of the few glass compositions that most effectively resist thermal embrittlement and provide optimum thermal stability, only essentially pure silica fibers formed either directly by fiberizing an all silica melt, or indirectly by acid leaching common glass fibers of silica and metal oxides to remove the latter and then thermally fusing the remaining silica skeleton, have been found suitable in applications exposed to temperatures exceeding about 2000° F., or of about 2300° F. hot face or only on one side, and even pure silica fibers are rapidly embrittled and deteriorate at temperatures approaching 2500° F. whereupon the structural degradation accelerates at an ever increasing rate. The manufacture of such essentially pure silica fibers, moreover, comprises costly and involved processes requiring either the fiberizing of a material having a melting point in the order of 3000° F., or the acid leaching of the metal oxides from a common glass fiber and a heat fusing treatment with the unavoidable result that production rates in either case are relatively low and the attendant manufacturing cost high.

In addition to essentially pure silica fibers there is a specific class of compositions which readily fiberize with conventional techniques and, depending upon ingredients and impurities, provide fiber suitable for service up to a maximum of between about 2000° F. and 2300° F. ambient, or possibly up to about 2500° F. on one side or hot face. These comprise a well known group of compositions comprising typically substantially equal parts of alumina and silica, viz. about 40 to 60% $SiO_2$ and about 40 to 60% $Al_2O_3$, commonly modified by the inclusion of smaller quantities, for example up to about 10 or even 20%, of one or more oxides such as boron oxide, titania, zirconia, or ferric oxide, as a means of facilitating the melting and fiber formation. Addition of a third, fourth, etc., ingredient in any significant quantities to the basic alumina-silica system, however, has always resulted in lowering the upper temperature limits of about 2300° F. downwards to about 2000° F. or less, due to their fluxing effect.

More specific details concerning the available high temperature refractory fibrous compositions and products thereof referred to above and their practical temperature limits are given in two articles by John A. Goodrich and Robert Matchett in Product Engineering entitled, "Critical Evaluation of the Inorganic Fibers," Aug. 3, 1964, pages 96 through 100, and "Applications for the Inorganic Fibers," Aug. 31, 1964, pages 63 through 66.

It is the primary object of this invention to provide a new refractory fiber of improved thermal stability which will effectively perform under sustained ambient temperature conditions of up to 2700° F., and in short term or transit applications up to about 2900° F.

It is also a primary object of this invention to provide specific combinations of materials forming novel glass compositions which enable rapid batch melting rates, and are amenable to conventional fiberizing techniques and procedures producing noncrystalline refractory fiber which retain their structural integrity, strength and resiliency over prolonged temperature conditions ranging up to and including about 2700° F.

It is a further object of this invention to provide an economical and practical means of promoting and accelerating the melting and facilitating the fiberizing with high recovery rates of a thermally stable refractory glass material, and of producing fibers or felts and products thereof of improved flexibility, resiliency and handleability which effectively resist degradation or impairment of its original insulating values and physical characteristics at temperatures appreciably exceeding the limit of currently available products.

It is a still further object of this invention to provide improved compositions and means for the manufacture of fibrous insulations and enhanced inorganic fibrous insulating products thereof of high insulating value serviceable over all temperature conditions ranging up to and including 2700° F.

These and other objects and advantages of this invention will become more apparent and appreciated from the hereinafter detailed disclosure and drawings, wherein:

FIG. 1 comprises a triaxial phase diagram illustrating the essential relative proportions of the exclusive ingredients which make up the basic glass compositions of this invention.

FIG. 2 comprises a graph illustrating the relative thermal stability of a product of this invention in relation to the same properties of a commercial product which has achieved significant success in a variety of aerospace applications.

FIG. 3 comprises a graph illustrating the linear shrinkage of the fiber of this invention in relation to this property of the same commercial product employed as a standard in the graph of FIG. 2.

This invention comprises the discovery that upon including only minor, but critical, specific amounts of chromic oxide with a very limited range of relative proportions of alumina and silica, the resulting combination of said materials upon fusing into a melt and thus solidifying into an isotropic amorphous glass to cooperate or interact as to result in a restricted class of compositions which facilely produce fine fibers of markedly improved thermal stability over commercially available high temperature fibrous products, or any known related compositions. The pronounced increase in the thermal stability and related beneficial properties found in the confined claimed range of compositions of this invention over and beyond that of substantially similar compositions or proportions of alumina and silica alone, or with charmic oxide in amounts virtually circumscribing the area of compositions constituting this invention is considered to be clearly indicative of a unique or synergistic effect. For instance, within the prerequisite ratios of the alumina and silica components for this invention, the inclusion of about 1% by weight up to about 6% by weight of chromic oxide will increase the percentage of thermal stability, a criterion determined as described hereinafter, about five times over that of similar alumina-silica compositions within the same relative ratios containing either no chromic oxide or about 10% chromic oxide.

Specifically the thermally unique compositions of this invention are restricted to molecularly uniform or isotropic and noncrystalline glass structures consisting essentially of alumina-silica-chromic oxide systems in the approximate relative ratios by weight of alumina 35 to 55%, silica 40 to 60%, and chromic oxide 1 to 8%, and preferably for optimum thermal stability, approximately 37 to 53% alumina, 46 to 57% silica, and 1 to 6% chromic oxide. Moreover, it has been found that to facilitate melting of the raw materials, fiber formation, and enhance the quality thereof in addition to improving thermal stability, that beyond the foregoing composition ratios, the alumina and silica should be proportioned within an alumina to silica ratio of between 0.62 $Al_2O_3$ to 1 $SiO_2$ and 1.2 $Al_2O_3$ to 1 $SiO_2$, and preferably between approximately 0.69 $Al_2O_3$ to 1 $SiO_2$ and 0.95 $Al_2O_3$ to 1 $SiO_2$.

A more exacting and concise definition of the three component glass compositions or amorphous systems responsible for the improvements of this invention, or accurate disclosure of the relative proportions of the ingredients thereof is given in the triaxial phase diagram of FIG. 1 of the drawings, graphically defining and illustrating the restricted area specifying the distinctive compositions and the relative ratio of ingredients constituting the same. In the triaxial phase diagram or graph of FIG. 1 the line labeled A and circumscribing the larger area, delimits the approximate outer boundaries of the compositions of this invention in its apparent broadest aspects, or wherein the compositions have been found to produce at least about twice the percentage thermal stability upon prolonged heat soaking at 2500° F., as defined hereinafter, over surrounding alumina-silica or alumina-silica-chromic oxide compositions. The line labeled "B," in part superimposed upon or defining a conterminous boundary with line A as to the approximate minimum required $Cr_2O_3$ content, circumscribing the smaller area, defines the preferred compositions of this invention which have been found to produce four- to five-fold improvements in the percentage thermal stability upon prolonged heat soaking at 2500° F. over like surrounding compositions of proportions outside the area of line A.

The cardinal objective of this invention being to achieve a fibrous product of maximum thermal stability and refractory properties, the raw materials therefor should be of the highest degree of purity available; for example, pulverized silica sand with $SiO_2$ content of 99.6+%, alumina with an $Al_2O_3$ content of 99+% and chromic oxide with a $Cr_2O_3$ content of 99.6+%. The use of raw materials of less purity can be expected to have a detrimental effect upon the thermal properties decidedly detracting from the improvements of this invention and data thereof presented hereinbecause of the fluxing effect upon the composition and, in turn, depression of the temperature limit thereof due to foreign oxides as is evident in the art.

The alumina-silica-chromic oxide ratios of fiber compositions of this invention are amenable to conventional melting and fiberizing means and techniques. For example, a typical electric furnace utilizing carbon or graphite electrodes as the heat source constitutes a suitable and preferred means for the preparation of the melt from apt raw materials such as those referred to hereinbefore. Fiberization of melts can be achieved with high yields also through the use of conventional means comprising spinning with high speed rotors, steam or hot gas blowing, flame attenuation, etc., with the former means preferred. Compositions of this invention, moreover, have been found to facilitate the melting and fiberizing operations and are easier and more economical to work with than many similar alumina-silica materials.

Rather than being an exact property, the melting point of glasses, or noncrystalline "solid solutions," is typically very gradual, spanning over extended temperature ranges of, in some cases up to several hundred degrees during which the viscosity thereof is slowly reduced from a solid, immobile and unflexible state, to a highly fluid state. Hence, short of definitely correlating or specifying the physical condition or viscosity of the glass together with the temperature thereof, the melting point, or fusing, sintering, or the like terms, comprises an equivocal and thus frequently misleading physical property. Moreover, most very high temperature insulating applications encounter some and often very aggressive mechanical action or forces such as vibration, and due to thermal embrittlement with the attendant resultant loss of strength and resiliency and mechanical abuse, the fiber structure thereof, and in turn its insulating value is effectively destroyed at temperatures far below the actual softening or melting point of the chemical composition thereof. Accordingly, a test which more realistically duplicates normal thermal and physical conditions encountered in common high temperature insulation applications in that it includes simulated mechanical action has been empolyed in the evaluation of the improved fibers of this invention and in comparing them with typical high temperature fibrous insulations currently available to accurately appraise the same under conditions substantially similar to actual service. The test which has been utilized in obtaining the thermal stability data in the hereinafter examples of the refractory fibers of this invention, is set forth in detail following.

The thermal stability evaluation test employed in the appraisal of the fibrous products of this invention, and comparison thereof with prior art materials, utilizes a standard set of Ro-Tap sieves and shaker apparatus. The procedure comprises taking an apt sample, in this case approximately 25 grams, of the fibers to be tested, and subsequent to firing at the given condition, i.e., 2400° F. for 24 hours, placing it in the top screen in a nest of a number 4, 6 and 10 mesh sieves and pan in the Ro-Tap apparatus and ro-tapping the sample for 20 minutes, then determining the total material remaining on the three screens and in the pan to one thousandth of a gram. The total material retained on each of the successive screens consisting of both fiber and shot is considered stable, while that which has passed down through to the pan, also consisting of short fiber and shot, is considered unstable. Next, the shot or non-fibrous phase of the sample which consists of more concentrated bodies than the elongated fibers, and in turn possesses greater neat stability, is separated from the fiber in order that it will not influence or increase the determined stability of the fiber. The shot separation is effected by weighing each the stable and unstable fraction and placing them in separate suitable ceramic crucibles and firing under conditions which effectively break down and disintegrate the fibrous phase. The respective fractions, upon completion of the destructive firing and cooling, are ro-tapped for 20 minutes over nested No. 28, 48, 100, 200 and 325 mesh sieves and pan with each sieve containing several halved rubber stoppers to augment the agitation. After ro-tapping the rubber stopper agitators are removed from the sieves and any sieves with fiber remaining thereon are kept mounted together with the pan, and working down from the uppermost or largest sieve with any retained fiber, the fibrous content of each is brushed with a soft paint brush to dislodge and achieve further separation of the material retained on each sieve. The material thereafter or finally retained on any sieve is shot, and that passing through to the 325 mesh sieve is the fiber. The thermal stability of the fiber is calculated by dividing the weight of that portion of the fraction initially retained on the No. 4, 6 and 10 sieves and subsequantly determined to be fibrous, by the total weight of said portion plus the weight of the unstable fraction also determined to be fibrous. The results are reported as percent of fiber stable at the given heat soaked level. This test corresponds in sample treatment and evaluation to the Government Military refractory fiber test procedure specification for thermal stability, MIL-1-23128A (Ships) Aug. 24, 1962, except that the military specification reports the results conversely by giving the percentage of fiber thermally unstable rather than the percentage of fiber which is stable as above.

The following examples comprise illustrations of preferred and typical compositions and the properties thereof of this invention, demonstrating the pronounced improvements and advantages of the invention over similar or apparetly related available and known materials. It is to be understood that the specific proportions or ratios of the compositions given in the examples, and the means, conditions, techniques, etc., set forth therein, are primarily exemplary and are not to be construed as limiting this invention to any specific ratio of components or composition other than those hereinbefore specified as essential.

Exemplary preferred compositions consisting essentially of the three components, alumina, silica and chromic oxide, within the specified essential proportions of this invention are given in the following examples and compared with similar commercial products, and with alumina-silica-chromic oxide ratios providing compositions outside the critical confinements of this invention, illustrating like properties of each to demonstrate the pronounced improvements and advantages attributable to the invention and the marked distinctiveness of the compositions necessary to achieve the improvements and advantages over similar materials, as well as supply the best mode contemplated to carry out the invention which has been found to constitute the composition of Example 1. The examples of compositions of this invention and the compositions of the standards and unsuitable similar materials beyond the scope of this invention are all set forth in tabular form to facilitate comparison. Table I supplies the ultimate fibrous product glass compositions and the contents of the formulations of the raw material batch for the melts in forming the glasses of both the examples of this invention and that of the standards and related material beyond the scope of the invention. Table II provides the relevant physical and thermal stability data for the compositions of Table I.

TABLE I.—CHEMICAL COMPOSITIONS OF FIBERS AND FORMULATIONS OF RAW MATERIALS

| | Fiber Composition, Percent | | | $Al_2O_3/SiO_2$ ratio | Formula Composition, Percent | | | Percent $Cr_2O_3$ lost during melting | Percent $SiO_2$ lost during melting |
|---|---|---|---|---|---|---|---|---|---|
| | $SiO_2$ | $Al_2O_3$ | $Cr_2O_3$ | | $SiO_2$ | $Al_2O_3$ | $Cr_2O_3$ | | |
| Standard Commercial Products | | | | | | | | | |
| Standard: | | | | | | | | | |
| 1 | 50 | 50 | | 1 | 52.5 | 47.5 | | | |
| 2 | 51 | 43.5 | *5.5 | | | | | | 2.9 |
| Examples of Invention | | | | | | | | | |
| Examples: | | | | | | | | | |
| 1 | 56.2 | 39.2 | 4.6 | 0.695 | 57 | 33 | 10 | 64 | 1.4 |
| 2 | 48.7 | 45.2 | 6.0 | 0.925 | 52 | 38 | 10 | 40 | 6.3 |
| 3 | 53.7 | 42.8 | 3.5 | 0.795 | 57 | 38 | 5 | 30 | 7.5 |
| 4 | 50.8 | 48.3 | 0.9 | 0.952 | 51.5 | 46.5 | 2 | 55 | 1.3 |
| 5 | 45.1 | 52.1 | 2.8 | 1.16 | 52.0 | 53.0 | 5.0 | 44 | 11.8 |
| 6 | 44.1 | 53.2 | 3.6 | 1.20 | 47.0 | 48.0 | 5.0 | 28 | 6.2 |
| 7 (marginal) | 38.0 | 57.5 | 4.5 | 1.50 | | | | | |
| 8 (marginal) | 53.7 | 37.9 | 8.4 | 0.705 | 57.0 | 33.0 | 10 | 16 | 5.8 |
| Compositions Outside Scope of Invention | | | | | | | | | |
| Composition: | | | | | | | | | |
| A | 52.4 | 32.7 | 14.9 | 0.625 | 52 | 28 | 20 | 2 | 3.0 |
| B | 45.6 | 44.6 | 9.8 | 0.985 | 47 | 43 | 10 | 2 | 3.0 |
| C | 47.5 | 30.7 | 21.8 | 0.647 | 47 | 26 | 27 | 19 | 0 |

*$TiO_2$.

TABLE II.—PROPERTIES

| | Standards | | Examples | | | | | | | | Compositions | | |
|---|---|---|---|---|---|---|---|---|---|---|---|---|---|
| | 1 | 2 | 1 | 2 | 3 | 4 | 5 | 6 | *7 | *8 | A | B | C |
| Fiber diameter, micron average | 3.1 | | 3.89 | 2.31 | 3.44 | 3.70 | 2.48 | 1.5 | | 2.81 | 3.45 | 1.84 | 2.47 |
| Fiber length | 5 | | 5 | 4 | 4 | 2 | 4 | 3 | | 5 | 2 | 4 | 1 |
| Shot content, crude wool, percent | | | 41 | 48 | 47 | 38 | 55 | 65 | | 47 | 39 | 65 | |
| Navy alkalinity, percent $Na_2O$ | 0.00 | 0.00 | 0.00 | 0.00 | 0.00 | 0.00 | 0.00 | 0.00 | | 0.00 | 0.00 | 0.00 | 0.00 |
| Thermal stability, percent: | | | | | | | | | | | | | |
| 24 hr. at— | | | | | | | | | | | | | |
| 1,800° F | 92 | 87 | | | | | | | | | | | |
| 1,900° F | 91 | 84 | | | | | | | | | | | |
| 2,100° F | 98 | 80 | | | | | | | | | | | |
| 2,300° F | 90 | 32 | | | | | | | | | | | |
| 2,500° F | 10 | | 57 | 56 | 55 | 55 | 41 | 40 | 35 | 23 | 17 | 12 | 10 |
| 2,600° F | | | | 27 | | | 26 | | | | | | |
| 2,700° F | | | 40 | 18 | | | 7 | | | | | | |
| Linear shrinkage of felts, percent: | | | | | | | | | | | | | |
| 4 hr. heat at— | | | | | | | | | | | | | |
| 2,400° F | 3.3 | | 2.0 | 2.2 | 2.7 | | 2.6 | 2.0 | | 2.1 | 2.0 | | |
| 2,500° F | 5.2 | | 2.0 | 2.3 | 2.5 | | | | | | | | |
| 2,600° F | 8.4 | | 2.1 | 2.8 | 3.1 | | 3.5 | 2.3 | | 2.2 | 2.5 | | |
| 2,700° F | 15.4 | | 3.7 | 5.0 | 5.7 | | 6.3 | 4.4 | | 2.9 | 4.0 | | |
| 2,800° F | 28.9 | | 11.4 | 15.7 | 17.9 | | | 15.2 | | 7.8 | 8.2 | | |

*Marginal.

The percent thermal stability, determined as described above, and the percent linear shrinkage of the fiber of this invention consisting of the composition of Example 1 are graphically presented and compared in FIGURES 2 and 3, respectively, of the drawings with like determined properties of a commercial product consisting of the composition of Standard 1 given above which has distinguished itself in a variety of applications including aerospace service.

The foregoing data and findings of this invention clearly demonstrate that the thermal properties of a very confined and distinctive discovered area or range of alumina-silica-chromic oxide glass compositions consisting essentially of relative minor critical amounts or proportions of $Cr_2O_3$ together with the necessary approximately equivalent ratios of $SiO_2$ and $Al_2O_3$ set forth, are significantly and extensively improved to an unpredictably pronounced point beyond that of apparently comparable compositions of various ratios of alumina and silica alone, or with chromic oxide, heretofore known in the art and as illustrated by the protracted and substantially infinite proposed compositions of alumina-silica alone, or together with titania and/or chromic oxide of British Patent No. 495,654 of Nov. 17, 1938. Moreover, contrary to common understanding in the art, within the discovered restrictive precepts of this invention, thermal stability does not necessarily increase with increased alumina content, and contrary to the apparent teaching of the said British patent, chromic oxide cannot be considered as an equivalent or substitute for alumina because amounts increasing beyond about 6% of chromic oxide in the alumina-silica system decidedly reverse the trend of enhanced thermal stability attributable to lesser quantities therein, providing a decided optimum and critical range which is in no way suggested or evident from the related prior art.

As is apparent from this disclosure and should be appreciated, this invention is concerned with and confined to a novel composition or product thereof of a conventional glass type structure, or stated otherwise, a unique and special formulation of a glass or material of uniform molecular structure which is isotropic, non-crystalline or amorphous, and of consistent chemical distribution having no significant variation in disposition of elements which constitute the normal physical condition of a glass produced from or by solidification of a fused mass or a melt of the respective ingredients. Hence the compositions of this invention are obviously distinctive in both structural make up and properties from any glass which has been treated with chromic acid in amounts which under normal chemical analysis might show like or similar ratios of chromic oxide, etc.

Fibrous products of this invention can be utilized in bulk or loose form or are amenable to fabrication into a variety of inorganic fibrous products comprising felts, papers, twisted or untwisted strands or cordage, tapes, etc., and may be incorporated into various bodies or structures as reinforcement, such as refractory cements, or any of the usual organic or inorganic bonding systems and constructions familiar to the art.

It will be understood that the foregoing details are given for purposes of illustration and not restriction, and that variations within the spirit of this invention are to be included within the scope of the appended claims.

What I claim is:

1. Refractory inorganic fibers of improved thermal stability of a glass having a composition consisting essentially, in approximate percentages by weight, of: alumina 35 to 55%, silica 40 to 60%, and chromic oxide 1 to 8%.

2. The refractory inorganic fiber of claim 1 wherein the relative amounts of the alumina-silica content of the composition are proportioned within an alumina to silica ratio of between 0.62 $Al_2O_3$ to 1 $SiO_2$ and 1.2 $Al_2O_3$ to 1 $SiO_2$.

3. Refractory inorganic fibers of improved thermal stability of a glass having a composition consisting essentially, in approximate percentages by weight, of: alumina 37 to 53%, silica 46 to 57%, and chromic oxide 1 to 6%.

4. The refractory inorganic fiber of claim 3 wherein the relative amounts of the alumina-silica content of the composition are proportioned within an alumina to silica ratio of between 0.62 $Al_2O_3$ to 1 $SiO_2$ and 1.2 $Al_2O_3$ to 1 $SiO_2$.

5. Refractory inorganic fibers of improved thermal stability of a glass having a composition consisting essentially, in approximate percentages by weight, of: alumina 37 to 53%, silica 46 to 57%, and chromic oxide 1 to 6%, the relative amounts of the alumina-silica content of the composition being proportioned within an alumina to silica ratio of between 0.69 $Al_2O_3$ to 1 $SiO_2$ and 0.95 $Al_2O_3$ to 1 $SiO_2$.

6. Refractory inorganic fibers of improved thermal stability of a glass having a composition consisting essentially, in approximate percentages by weight, of: alumina 39 to 49%, silica 47 to 56%, and chromic oxide 0.9 to 6.0%.

7. The refractory inorganic fiber of claim 6 wherein the relative amounts of the alumina-silica content of the composition are proportioned within an alumina to silica ratio of between 0.69 $Al_2O_3$ to 1 $SiO_2$ and 0.95 $Al_2O_3$ to 1 $SiO_2$.

8. Refractory inorganic fibers of improved thermal stability of a glass having a composition consisting essentially, in approximate percentages by weight, of: alumina 39%, silica 56%, and chromic oxide 5%.

9. Refractory inorganic fibers of improved thermal stability of a glass having a composition consisting essentially of alumina, silica and chromic oxide within the relative proportions by weight defined by the area bound by the line A of the triaxial diagram of FIG. 1 of the drawing.

10. The refractory inorganic fiber defined in claim 9 wherein the relative amounts of the alumina-silica content of the composition are proportioned within an alumina to silica ratio of between 0.62 $Al_2O_3$ to 1 $SiO_2$ and 1.2 $Al_2O_3$ to 1 $SiO_2$.

11. Refractory inorganic fibers of improved thermal stability of a glass having a composition consisting essentially of alumina, silica and chromic oxide within the relative proportions by weight defined by the area bounded by line B of the triaxial diagram of FIG. 1 of the drawing.

12. The refractory inorganic fiber defined by claim 11 wherein the relative amounts of the alumina-silica content of the composition are proportioned within an alumina to silica ratio of between 0.69 $Al_2O_3$ to 1 $SiO_2$ and 0.95 $Al_2O_3$ to 1 $SiO_2$.

References Cited

FOREIGN PATENTS 495,654    11/1938    Great Britain.

JAMES E. POER, *Primary Examiner.*

U.S. Cl. X.R.

106—52